United States Patent
Cain et al.

(10) Patent No.: US 11,342,545 B2
(45) Date of Patent: May 24, 2022

(54) METHODS OF LITHIATING ELECTROACTIVE MATERIALS

(71) Applicant: GM GLOBAL TECHNOLOGY OPERATIONS LLC, Detroit, MI (US)

(72) Inventors: Jeffrey D. Cain, Royal Oak, MI (US); Andrew C. Bobel, Troy, MI (US); Nicholas P. Pieczonka, Windsor (CA); Robert D. Schmidt, Royal Oak, MI (US); Anil K. Sachdev, Rochester Hills, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 16/706,331

(22) Filed: Dec. 6, 2019

(65) Prior Publication Data

US 2021/0175486 A1    Jun. 10, 2021

(51) Int. Cl.
*H01M 4/04* (2006.01)
*H01M 4/1391* (2010.01)
*H01M 10/0525* (2010.01)

(52) U.S. Cl.
CPC ....... *H01M 4/0457* (2013.01); *H01M 4/1391* (2013.01); *H01M 10/0525* (2013.01)

(58) Field of Classification Search
CPC ........ H01M 4/04; H01M 4/0457; H01M 4/13; H01M 4/1391
See application file for complete search history.

(56) References Cited

U.S. PATENT DOCUMENTS

| 8,859,144 B2 | 10/2014 | Xiao |
| 9,005,811 B2 | 4/2015 | Xiao et al. |

(Continued)

FOREIGN PATENT DOCUMENTS

| CN | 112928241 A | 6/2021 |
| DE | 102020129335 A1 | 6/2021 |

OTHER PUBLICATIONS

Halalay, Ion C. et al., U.S. Appl. No. 16/160,799, filed Oct. 15, 2018 entitled, "Method for Making Silicon-Containing Composite Electrodes for Lithium-Based Batteries," 47 pages.

(Continued)

*Primary Examiner* — Kenneth J Douyette
(74) *Attorney, Agent, or Firm* — Harness, Dickey & Pierce, P.L.C.

(57) ABSTRACT

The present disclosure relates to electroactive materials for use in electrodes of lithium-ion electrochemical cells and methods of making the same, for example, methods for lithiating electroactive materials. A method of lithiating an electroactive material may include dispersing an electroactive material precursor within a room-temperature electrolyte that includes a lithium-based salt and contacting the electrolyte mixture and a lithium source so as to cause the lithium source to ionize and form lithium ions. The lithium ions may react with the electroactive material precursor to form a fully lithiated electroactive material (e.g., greater than 70% of total lithiation). The method further includes, in certain aspects, electrochemically discharging the fully lithiated electroactive material to form a lithiated electroactive material having an optimized lithiation state (e.g., less than or equal to about 40% of a first lithiation state of the fully lithiated electroactive material).

20 Claims, 3 Drawing Sheets

(56) References Cited

U.S. PATENT DOCUMENTS

| | | | |
|---|---|---|---|
| 9,093,705 B2 | 7/2015 | Xiao et al. | |
| 9,142,830 B2 | 9/2015 | Xiao et al. | |
| 9,302,914 B2 | 4/2016 | Liu et al. | |
| 9,577,251 B2 | 2/2017 | Xiao et al. | |
| 9,780,361 B2 | 10/2017 | Xiao et al. | |
| 10,062,898 B2 | 8/2018 | Xiao | |
| 11,011,742 B2 | 5/2021 | Sachdev et al. | |
| 2017/0162859 A1* | 6/2017 | Yang | H01M 4/0445 |
| 2018/0062153 A1* | 3/2018 | Zhu | H01M 4/0452 |
| 2019/0067675 A1* | 2/2019 | Xiao | H01M 4/62 |
| 2019/0305298 A1* | 10/2019 | Chae | H01M 4/0495 |
| 2020/0119339 A1 | 4/2020 | Halalay et al. | |
| 2020/0350558 A1 | 11/2020 | Jimenez et al. | |
| 2020/0388825 A1 | 12/2020 | Verbrugge et al. | |
| 2021/0057752 A1 | 2/2021 | Jiang et al. | |
| 2021/0083264 A1 | 3/2021 | Jiang et al. | |
| 2021/0135194 A1 | 5/2021 | Wang et al. | |

OTHER PUBLICATIONS

Wang, Lei et al., U.S. Appl. No. 16/668,864, filed Oct. 30, 2019 entitled, "Method for Making Silicon-Carbon Composite Electrode Materials," 46 pages.

\* cited by examiner

METHODS OF LITHIATING ELECTROACTIVE MATERIALS

INTRODUCTION

This section provides background information related to the present disclosure which is not necessarily prior art.

The present disclosure relates to electroactive materials for use in electrodes of lithium-ion electrochemical cells and methods of making the same, for example, methods for lithiating electroactive materials.

Advanced energy storage devices and systems are in demand to satisfy energy and/or power requirements for a variety of products, including automotive products such as start-stop systems (e.g., 12V start-stop systems), battery-assisted systems, Hybrid Electric Vehicles ("HEVs"), and Electric Vehicles ("EVs"). Typical lithium-ion batteries include at least two electrodes and an electrolyte and/or separator. One of the two electrodes serves as a positive electrode or cathode and the other electrode serves as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of lithium (e.g., intercalated lithium), which is oxidized into lithium ions and electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

Silicon has the highest known theoretical charge capacity, making it one of the most promising negative electroactive materials for rechargeable lithium-ion batteries, but silicon also experiences excessive volumetric expansion and contraction (e.g., 300%) during successive charging and discharging. Further, a portion of the intercalated lithium remains with the negative electrode following the first cycle due to, for example, the formation of $Li_xSi$ and/or a solid electrolyte interphase (SEI) layer on the negative electrode during the first cycle, as well as ongoing lithium loss due to continuous solid electrolyte interphase breakage. Such permanent loss of lithium ions may result in a decreased specific energy and power in the battery resulting from added positive electrode mass that does not participate in the reversible operation of the battery. For example, the lithium-ion battery may experience an irreversible capacity loss of greater than or equal to about 5% to less than or equal to about 30% after the first cycle. Lithiation, for example pre-lithiation, may compensate for such losses. Common lithiation methods, however, require half-cell fabrication and tear-down and/or high temperature chemical processes, which are time consuming and often cost-prohibitive. Accordingly, it would be desirable to develop improved electroactive and electrode materials, and methods of making the same, for an electrochemical cell that can address these challenges.

SUMMARY

This section provides a general summary of the disclosure, and is not a comprehensive disclosure of its full scope or all of its features.

In various aspects, the present disclosure provides a method for forming a lithiated electroactive material at room temperature. The method includes, for example, dispersing an electroactive material precursor within an electrolyte at room temperature that includes a lithium-based salt to form an electrolyte mixture; and contacting the electrolyte mixture and a lithium source so as to cause the lithium source to ionize and form lithium ions ($Li^+$). The lithium ions ($Li^+$) may react with the electroactive material precursor in the electrolyte mixture to form the lithiated electroactive material.

In one aspect, after the lithium ions ($Li^+$) react with the electroactive material precursor in the electrolyte mixture, the lithiated electroactive material may be in a first state, and the method may further include electrochemically discharging the lithiated electroactive material to a second state. The second state may have less than or equal to about 40% of the total lithium present in the lithiated electroactive material in the first state In one aspect, after the lithium ions ($Li^+$) react with the electroactive material precursor in the electrolyte mixture, the lithiated electroactive material is in a first state represented by the formula $Li_{4.4x}Si$, where $0.75 \leq x \leq 1$, and the method may further include electrochemically discharging the lithiated electroactive material to a second state. The second state may be represented by the formula $Li_{4.4x}Si$, where $0.015 \leq x \leq 0.5$.

In one aspect, the electroactive material precursor may be a silicon powder precursor. In the first state, the lithiated electroactive material may include $Li_{4.4}Si$. In the second state, the lithiated electroactive material may include $Li_{0.8}Si$.

In one aspect, the method for forming the lithiated electroactive material may be a continuous flow process, and the dispersing and contacting may occur in a first container and the electrochemically discharging may occur in a second container. The first and second containers may be formed from materials that are non-reactive with the electrolyte mixture.

In one aspect, the first and second containers may include one or more of stainless steel, nickel, and copper.

In one aspect, the first and second containers may be in fluid communication and the lithiated electroactive material may flow from the first container to the second container.

In one aspect, the second container may include a counter electrode. The counter electrode may include one or more of graphite, lithium phosphate ($Li_3PO_4$) (LPO), and lithium titanate ($Li_2TiO_3$) (LTO).

In one aspect, the counter electrode may be disposed within a separator.

In one aspect, the method may include applying a voltage bias to the counter electrode. Upon application of the voltage bias, the discharged lithium ions ($Li^+$) may move from the lithiated electroactive particles to the counter electrode so as to form the lithiated electroactive material having the second state. The voltage bias may be greater than or equal to about 0.1 V to less than or equal to about 24 V. The voltage bias may be applied for greater than or equal to about 1 minute to less than or equal to about 24 hours.

In one aspect, the dispersing and contacting may occur in a container and, prior to electrochemically discharging, the method may further include extracting the lithium source from the container and disposing a counter electrode within the container and conducting the electrochemically discharging.

In one aspect, the counter electrode may include one or more of graphite, lithium phosphate ($Li_3PO_4$) (LPO), and lithium titanate ($Li_2TiO_3$) (LTO). The container may include one or more of stainless steel, nickel, and copper.

In one aspect, after electrochemically discharging, the discharged lithium ions ($Li^+$) may be recaptured and recycled.

In one aspect, the method may further includes isolating the lithiated electroactive material.

In one aspect, the lithium source may coat an interior channel of a channel flow reactor and the electrolyte mixture may travel through the channel flow reactor.

In one aspect, the lithium source may define an interior surface of a channel flow reactor and the electrolyte mixture may travel through the channel flow reactor.

In various other aspects, the present disclosure provides another method for forming a lithiated electroactive material at room temperature. The method may include dispersing a silicon powder precursor within an electrolyte at a room-temperature electrolyte that comprises a lithium-based salt and contacting the electrolyte mixture and a lithium source so as to cause the lithium source to ionize and form lithium ions ($Li^+$). The lithium ions ($Li^+$) may react with the silicon powder precursor to form $Li_{4.4x}Si$, where $0.75 \leq x \leq 1$. The method may further include applying a voltage bias to a counter electrode in electrical communication with the $Li_{4.4x}Si$ to cause electrochemical discharge of lithium ions ($Li^+$) that move from $Li_{4.4x}Si$ towards the counter electrode to form $Li_{4.4x}Si$, where $0.015 \leq x \leq 0.5$.

In one aspect, the voltage bias may be greater than or equal to about 0.1 V to less than or equal to about 24 V. The voltage bias may be applied for a greater than or equal to about 1 minute to less than or equal to about 24 hours.

In one aspect, the method for forming the lithiated electroactive material may be a continuous flow process.

In one aspect, the lithium source may define an interior channel of a channel flow reactor and the electrolyte mixture may travel through the channel flow reactor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers, and/or sections should not be limited by these terms, unless otherwise indicated. These terms may be only used to distinguish one step, element, component, region, layer, or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology relates to electroactive materials for use in electrodes of lithium-ion electrochemical cells and methods of making the same, for example methods for lithiating electroactive materials so as to reduce operational inefficiencies resulting from, for example, loss of active lithium ions during the first cell cycle. For example, the method generally includes dispersing an electroactive material precursor within an electrolyte including a lithium-base salt to form an electrolyte mixture; contacting the electrolyte mixture and a lithium source to ionize and form lithium ions that react with the electroactive material precursor to form a lithiated electroactive material. The lithiated electroactive material may have a first or full state of lithiation, for example greater than 70% of total lithiation. In certain instances, the method may include electrochemically discharging the lithiated electroactive material to a second or optimized state of lithiation, for example having less than or equal to about 40% of lithium compared to lithiated electroactive materials in the first state.

Figure 1:
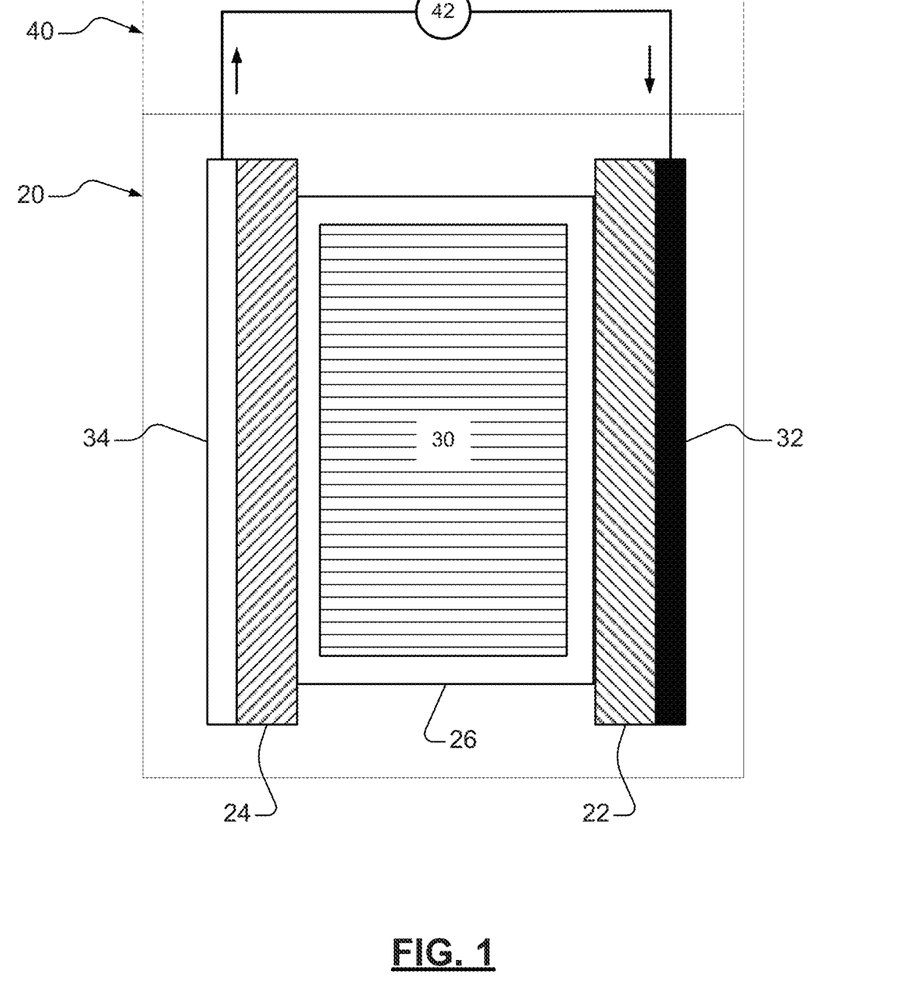
FIG. 1 is a schematic of an example electrochemical battery that cycles lithium ions.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1. Though the illustrated example includes a single cathode 24 and a single anode 22, the skilled artisan will recognize that the current teachings apply to various other configurations, including those having one or more cathodes and one or more anodes, as well as various current collectors with electroactive layers disposed on or adjacent to one or more surfaces thereof.

The battery 20 includes a negative electrode 22, a positive electrode 24, and a separator 26 disposed between the electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte 30. For example, the separator 26 may be defined by a plurality of solid-state electrolyte particles (not shown).

A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34). The positive electrode current collector 34 may be a metal foil, metal grid or screen, or expanded metal, comprising aluminum or any other appropriate electrically conductive material known to those of skill in the art. The negative electrode current collector 32 may be a metal foil, metal grid or screen, or expanded metal, comprising copper or any other appropriate electrically conductive material known to those of skill in the art.

The battery 20 may generate an electric current during discharge by way of reversible electrochemical reactions that occur when the external circuit 40 is closed (to connect the negative electrode 22 and the positive electrode 24) and the negative electrode 22 contains a relatively greater quantity of lithium than the positive electrode 24. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions, which are also produced at the negative electrode 22, are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium-ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back towards the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 described above includes a liquid electrolyte and shows representative concepts of battery operation. However, the battery 20 may also be a solid-state battery that includes a solid-state electrolyte that may have a different design, as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30, for example inside their pores, capable of conducting lithium ions between the negative electrode 22 and the positive electrode 24. Any appropriate electrolyte 30, whether in solid, liquid, or gel form, capable of conducting lithium ions between the electrodes 22, 24, may be used in the battery 20. For example, the electrolyte 30 may be a non-aqueous liquid electrolyte solution that includes a lithium salt dissolved in an organic solvent or a mixture of organic solvents. Numerous conventional non-aqueous liquid electrolyte solutions may be employed in the battery 20.

Appropriate lithium salts generally have inert anions. A non-limiting list of lithium salts that may be dissolved in an organic solvent or a mixture of organic solvents to form the non-aqueous liquid electrolyte solution include lithium hexafluorophosphate ($LiPF_6$); lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiFSI), lithium fluoroalkylphosphate (LiFAP) ($Li_3O_4P$), and combinations thereof.

These and other similar lithium salts may be dissolved in a variety of organic solvents, including, but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof. In various aspects, the electrolyte may include greater than or equal to 1M to less than or equal to about 2M concentration of the one or more lithium salts. In certain variations, for example when the electrolyte has a lithium concentration greater than about 2 M or ionic liquids, the electrolyte may include one or more diluters, such as fluoroethylene carbonate (FEC) and/or hydrofluoroether (HFE).

The solid-state electrolyte may include one or more solid-state electrolyte particles that may comprise one or more polymer-based particles, oxide-based particles, sulfide-based particles, halide-based particles, borate-based particles, nitride-based particles, and hydride-based particles. Such a solid-state electrolyte may be disposed in a plurality of layers so as to define a three-dimensional structure, and in certain aspects, the separator 26. In various aspects, the polymer-based particles may be intermingled with a lithium salt so as to act as a solid solvent.

In various aspects, the oxide-based particles may comprise one or more garnet ceramics, LISICON-type oxides, NASICON-type oxides, and Perovskite-type ceramics. For example, the one or more garnet ceramics may be selected from the group consisting of: $Li_{6.5}La_3Zr_{1.75}Te_{0.25}O_{12}$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, and combinations thereof. The one or more LISICON-type oxides may be selected from the group consisting of: $Li_{14}Zn(GeO_4)_4$, $Li_{3+x}(P_{1-x}Si_x)O_4$ (where 0<x<1), $Li_{3+x}Ge_xV_{1-x}O_4$ (where 0≤x≤1), and combinations thereof. The one or more NASICON-type oxides may be defined by $LiMM'(PO_4)_3$, where M and M' are independently selected from Al, Ge, Ti, Sn, Hf, Zr, and La. For example, in certain variations, the one or more NASICON-type oxides may be selected from the group consisting of: $Li_{1+x}Al_xGe_{2-x}(PO_4)_3$ (LAGP) (where 0≤x≤2), $Li_{1+x}Al_xTi_{2-x}(PO_4)_3$ (LATP) (where 0≤x≤2), $Li_{1+x}Y_xZr_{2-x}(PO_4)_3$ (LYZP) (where 0≤x≤2), $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The one or more Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), and combinations thereof.

In various aspects, the polymer-based particles may comprise one or more of polymer materials selected from the group consisting of: polyethylene glycol, poly(p-phenylene oxide) (PPO), poly(methyl methacrylate) (PMMA), polyacrylonitrile (PAN), polyvinylidene fluoride (PVDF), poly(vinylidene fluoride-co-hexafluoropropylene (PVDF-HFP), polyvinyl chloride (PVC), and combinations thereof. The sulfide-based particles may include one or more sulfide-based materials selected from the group consisting of: $Li_2S$—$P_2S_5$, $Li_2S$—$P_2S_5$-$MS_x$ (where M is Si, Ge, and Sn and 0≤x≤2), $Li_{3.4}Si_{0.4}P_{0.6}S_4$, $Li_{10}GeP_2S_{11.7}O_{0.3}$, $Li_{9.6}P_3S_{12}$, $Li_7P_3S_{11}$, $Li_9P_3S_9O_3$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li(Ge_{0.5}Sn_{0.5})P_2S_{12}$, $Li(Si_{0.5}Sn_{0.5})P_sS_{12}$, $Li_{10}GeP_2S_{12}$ (LGPS), $Li_6PS_5X$ (where X is Cl, Br, or I), $Li_7P_2S_8I$, $Li_{10.35}Ge_{1.35}P_{1.65}S_{12}$, $Li_{3.25}Ge_{0.25}P_{0.75}S_4$, $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where 0.5≤x≤0.7), and combinations thereof. The halide-based particles may include one or more halide-based materials selected from the group consisting of: $Li_2CdCl_4$, $Li_2MgCl_4$, $Li_2CdI_4$, $Li_2ZnI_4$, $Li_3OCl$, $LiI$, $Li_5ZnI_4$, $Li_3OCl_{1-x}Br_x$ (where 0<x<1), and combinations thereof.

In various aspects, the borate-based particles may include one or more borate-based materials selected from the group consisting of: $Li_2B_4O_7$, $Li_2O$—$(B_2O_3)$—$(P_2O_5)$, and combinations thereof. The nitride-based particles may include one or more nitride-based materials selected from the group consisting of: $Li_3N$, $Li_7PN_4$, $LiSi_2N_3$, LiPON, and combinations thereof. The hydride-based particles may include one or more hydride-based materials selected from the group consisting of: $Li_3AlH_6$, $LiBH_4$, $LiBH_4$—LiX (where X is one of Cl, Br, and I), $LiNH_2$, $Li_2NH$, $LiBH_4$—$LiNH_2$, and combinations thereof. In still further variations, the electrolyte 30 may be a quasi-solid electrolyte comprising a hybrid of the above detailed non-aqueous liquid electrolyte solution and solid-state electrolyte systems—for example including one or more ionic liquids and one or more metal oxide particles, such as aluminum oxide ($Al_2O_3$) and/or silicon dioxide ($SiO_2$).

In various aspects, such as when the electrolyte 30 is a non-aqueous liquid electrolyte solution, the separator 26 may be a microporous polymeric separator including, for example a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multilayered structured porous films of PE and/or PP. Commercially available polyolefin porous membranes include CELGARD® 2500 (a monolayer polypropylene separator) and CELGARD® 2320 (a trilayer polypropylene/polyethylene/polypropylene separator) available from Celgard LLC. Various other conventionally available polymers and commercial products for forming the separator 26 are contemplated, as well as the many manufacturing methods that may be employed to produce such a microporous polymer separator 26.

When the separator 26 is a microporous polymeric separator, it may be a single layer or a multi-layer laminate, which may be fabricated from either a dry or wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26.

The separator 26 may also comprise other polymers in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina ($Al_2O_3$), silica ($SiO_2$), titania ($TiO_2$), and combinations thereof. The heat-resistant material may be selected from the group consisting of: Nomex, Aramid, and combinations thereof.

In various aspects, the positive electrode 24 comprises a lithium-based positive electroactive material that is capable of undergoing lithium intercalation and deintercalation, alloying and dealloying, or plating and stripping, while functioning as a positive terminal of the capacitor battery 20. In various aspects, the positive electrode 24 may be defined by a plurality of electroactive material particles (not shown). Such positive electroactive material particles may be disposed in one or more layers so as to define the three-dimensional structure of the positive electrode 24. In certain variations, as noted above, the positive electrode 24 may further include the electrolyte 30, for example a plurality of electrolyte particles (not shown).

In various aspects, the positive electrode 24 may be one of a layered-oxide cathode, a spinel cathode, and a polyanion cathode. For example, layered-oxide cathodes (e.g., rock salt layered oxides) comprise one or more lithium-based positive electroactive materials selected from $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where M is one of Mn, Ni, Co, and Al and $0 \leq x \leq 1$) (for example $LiCoO_2$ (LCO), $LiNiO_2$, $LiMnO_2$, $LiNi_{0.5}Mn_{0.5}O_2$, NMC111, NMC523, NMC622, NMC 721, NMC811, NCA). Spinel cathodes comprise one or more lithium-based positive electroactive materials selected from $LiMn_2O_4$ and $LiNi_{0.5}Mn_{1.5}O_4$. Olivine type cathodes comprise one or more lithium-based positive electroactive material such as $LiV_2(PO_4)_3$, $LiFePO_4$, $LiCoPO_4$, and $LiMnPO_4$. Tavorite type cathodes comprise, for example, $LiVPO_4F$. Borate type cathodes comprise, for example, one or more of $LiFeBO_3$, $LiCoBO_3$, and $LiMnBO_3$. Silicate type cathodes comprise, for example, $Li_2FeSiO_4$, $Li_2MnSiO_4$, and $LiMnSiO_4F$. In still further variations, the positive electrode 24 may comprise one or more other positive electroactive materials, such as one or more of dilithium (2,5-dilithiooxy)terephthalate and polyimide. In various aspects, the positive electroactive material may be optionally coated (for example by $LiNbO_3$ and/or $Al_2O_3$) and/or may be doped (for example by one or more of magnesium (Mg), aluminum (Al), and manganese (Mn)).

The positive electroactive material of the positive electrode 24 may be optionally intermingled with one or more electrically conductive materials that provide an electron conductive path and/or at least one polymeric binder material that improves the structural integrity of the positive electrode 24. For example, the positive electroactive material in the positive electrode 24 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the positive electrode 24 may include greater than or equal to about 50 wt. % to less than or equal to about 99 wt. %, and in certain aspects, optionally greater than or equal to about 50 wt. % to less than or equal to about 95 wt. %, of the positive electroactive material; greater than or equal to about 0 wt. % to less than or equal to about 30 wt. %, and in certain aspects, optionally greater than or equal to about 2 wt. % to less than or equal to about 5 wt. %, of one or more electrically conductive materials; and greater than or equal to about 0 wt. % to less than or equal to about 20 wt. %, and in certain aspects, optionally greater than or equal to about 2 wt. % to less than or equal to about 5 wt. %, of one or more binders.

In various aspects, the negative electrode 22 comprises a lithium host material that is capable of functioning as a negative terminal of a lithium-ion battery. For example, the negative electrode 22 may comprise a lithium host material (e.g., negative electroactive material) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. In certain variations, as noted above, the negative electrode 22 may further include the electrolyte 30, for example a plurality of electrolyte particles (not shown).

The negative electrode 22 may include a negative electroactive material that is lithium based comprising, for example, a lithium metal and/or lithium alloy. In other variations, the negative electrode 22 may include a negative electroactive material that is silicon based comprising silicon, for example, a silicon alloy, silicon oxide, or combinations thereof that may be further mixed, in certain instances, with graphite. In still other variations, the negative electrode 22 may be a negative electroactive material that is a carbonaceous anode comprising, for example, one or more negative electroactive materials such as graphite, graphene, and/or carbon nanotubes (CNTs). In still further variations, the negative electrode 22 may comprise one or more lithium-accepting negative electroactive materials, such as lithium titanium oxide ($Li_4Ti_5O_{12}$), one or more transition metals (such as tin (Sn)), one or more metal oxides (such as vanadium oxide ($V_2O_5$), tin oxide (SnO), titanium dioxide ($TiO_2$)), titanium niobium oxide ($Ti_xNb_yO_z$, where $0 \leq x \leq 2$, $0 \leq y \leq 24$, and $0 \leq z \leq 64$), and one or more metal sulfides (such as ferrous or iron sulfide (FeS)). In various aspects, as further detailed below, the negative electroactive material may be pre-lithiated.

In various aspects, the negative electroactive material in the negative electrode 22 may be optionally intermingled with one or more electrically conductive materials that provide an electron conductive path and/or at least one polymeric binder material that improves the structural integrity of the negative electrode 22. For example, the negative electroactive material in the negative electrode 22 may be optionally intermingled with binders such as poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS), lithium polyacrylate (LiPAA), sodium polyacrylate (NaPAA), sodium alginate, lithium alginate, ethylene propylene diene monomer (EPDM), and combinations thereof. Electrically conductive materials may include carbon-based materials, powder nickel or other metal particles, or a conductive polymer. Carbon-based materials may include, for example, particles of carbon black, graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like.

For example, the negative electrode 22 may include greater than or equal to about 50 wt. % to less than or equal to about 99 wt. %, and in certain aspects, optionally greater than or equal to about 50 wt. % to less than or equal to about 95 wt. %, of the negative electroactive material; greater than or equal to about 0 wt. % to less than or equal to about 30 wt. %, and in certain aspects, optionally greater than or equal to about 5 wt. % to less than or equal to about 20 wt. %, of one or more electrically conductive materials; and greater than or equal to about 0 wt. % to less than or equal to about 20 wt. %, and in certain aspects, optionally greater than or equal to about 5 wt. % to less than or equal to about 15 wt. %, of one or more binders.

As further detailed above, during discharge, the negative electrode 22 may contain a comparatively high concentration of intercalated lithium, which is oxidized into lithium ions and electrons. Lithium ions may travel from the negative electrode 22 to the positive electrode 24, for example, through the ionically conductive electrolyte 30 contained within the pores of an interposed porous separator 26. Concurrently, electrons pass through an external circuit 40 from the negative electrode 22 to the positive electrode 24. Such lithium ions may be assimilated into the material of the positive electrode 24 by an electrochemical reduction reaction. The battery may be recharged or regenerated after a partial or full discharge of its available capacity by an external power source, which reverses the electrochemical reactions that transpired during discharge.

In various instances where electrochemical cells include silicon, a portion of the intercalated lithium remains within the negative electrode 22 following a first cycle due to, for example, the formation of a solid electrolyte interphase (SEI) layer (not shown) on the negative electrode 22 during the first cycle, as well as, for example, ongoing lithium loss due to continuous solid electrolyte interphase breakage. For example, electrochemical cells including negative electrodes comprising silicon may experience a first cycle capacity loss of greater than about 20%, and in certain aspects, about 40%. Likewise, electrochemical cells including negative electrodes comprising silicon or silicon oxides ($SiO_x$) may experience a first cycle capacity loss of about 40%. Such first cycle capacity losses create situations of low energy densities. This permanent loss of lithium ions may result in a decreased specific energy and power in the battery 20 resulting from, for example, added positive electrode mass that does not participate in the reversible operation of the battery.

Figure 2:
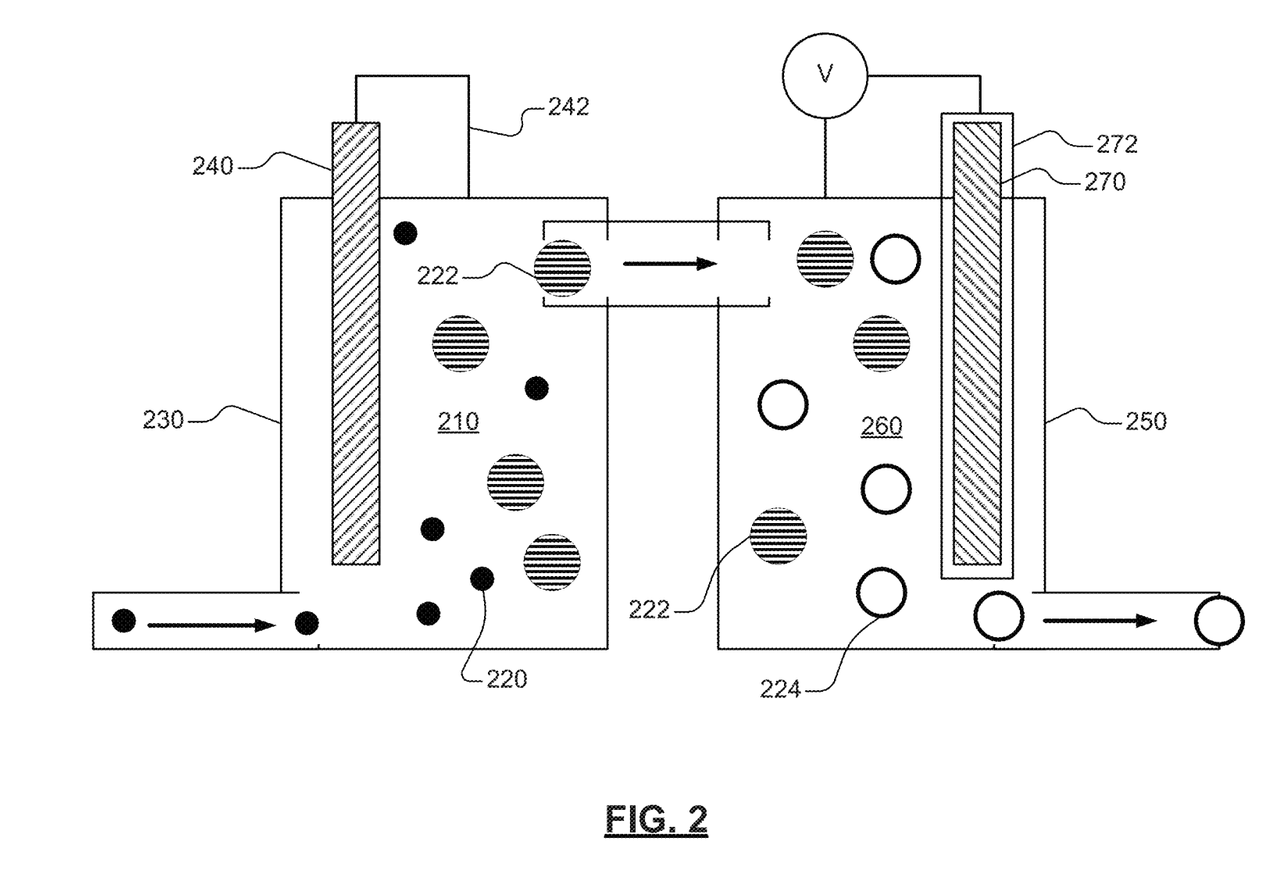
FIG. 2 is a schematic of an example continuous flow process for lithiating electroactive materials.

In various aspects, the present disclosure provides a continuous flow method for making electroactive materials, for example, electroactive materials for negative electrode 22 as illustrated in FIG. 1. The method includes contacting an electroactive material and an electrolyte including a lithium-based salt such that the electroactive material is dispersed within the electrolyte. For example, as seen in FIG. 2, the method may include introducing an electroactive material precursor, for example a plurality of electroactive particles 220, to a first container or vessel 230 containing or carrying a first electrolyte 210. The first container 230 is sized such that the space velocity enables lithiation of the electroactive material, for example $Li_{4.4x}Si$ (where $0.05 \leq x \leq 0.8$). The first container 230 is non-reactive with the first electrolyte 210 and its contents. For example, the container 230 may be made of stainless steel, nickel, and/or copper.

In various aspects, the electroactive particles 220 may comprise, for example, a silicon powder comprising silicon (Si) and/or silicon oxide ($SiO_x$, where $0 \leq x \leq 2$) or a tin powder comprising tin (Sn). In some instances, the electroactive particles 220 may include one or more coatings, for example a carbon coating and/or alumina coating. In certain aspects, the method may include pre-treating the electroactive particles 220, for example using plasma processes, to remove surface oxides, for example silicon oxides ($SiO_x$) that are less reactive with lithium and lithium ions ($Li^+$), as well as to improve mechanical and surface stabilization. The electroactive particles 220 may have a first average diameter greater than or equal to about 10 nm to less than or equal to about 10 μm, greater than or equal to about 1 μm to less than or equal to about 5 μm, and in certain aspects, optionally about 3 μm.

The first electrolyte 210 may include one or more lithium salts selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiFSI), lithium fluoroalkylphosphate (LiFAP) ($Li_3O_4P$), and combinations thereof and a solvent mixture including one or more of various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof.

The method may further include introducing a lithium source 240. In certain aspects, the lithium source 240 may have a surface area, for example, greater than or equal to about 0.01 cm$^2$ lithium source/1 mg electroactive material precursor to less than or equal to about 1 cm$^2$ lithium source/1 mg electroactive material precursor, and in certain aspects, optionally greater than or equal to about 0.1 cm$^2$ lithium source/1 mg electroactive material precursor to less than or equal to about 1 cm$^2$ lithium source/1 mg electroactive material precursor. The required surface area of the lithium source 240 may depend, in certain aspects, on the electrolyte 210 formulation, as well as the geometry of the container 230 and the selected electroactive material precursor, by way of non-limiting example. In various aspects, the lithium source 240 may include, for example, solid lithium in the form of lithium-plated mesh and/or foam, plates, rods, sheets, ribbons, chunks, powders, granules, other coatings, and/or other forms. In certain aspects, as illustrated, an optional electron path 242 may further connect the lithium source 240 and the first electrolyte 210.

When contacted with the first electrolyte 210, which may be at room temperature (for example, a temperature greater than or equal to about 20° C. to less than or equal to about 25° C., and in certain aspects, optionally about 21° C.), the lithium source 240 ionizes. For example, lithium has a comparatively low redox potential, for example about—3.04 V compared to the standard hydrogen electrode ("SHE"). Potential differences between the lithium and the electroactive material of the electroactive particles 220 causes electrons (e$^-$) to flow from the lithium source 240 to the electroactive particles 220 such that lithium ions (Li$^+$) are released into the first electrolyte 210 as a means of charge compensation. Charge neutrality is achieved when the lithium ions (Li$^+$), upon contacting the electroactive particles 220, follow the electrons and spontaneously form (Δ 42 kJ/mol) a fully lithiated electroactive material considered to be a first state, for example $Li_{4.4x}Si$ where 0.75≤x≤1, that defines first or fully lithiated electroactive particles 222. The first lithiated electroactive particles 222 may have a first lithiation state greater than or equal to about 70%, greater than or equal to about 80%, and in certain aspects, greater than or equal to about 90% of total lithiation. In various aspects, the first lithiated electroactive particles 222 may have a second average particle diameter greater than or equal to about 10 nm to less than or equal to about 30 μm, and in certain aspects, optionally greater than or equal to about 1 μm to less than or equal to about 10 μm.

Reaction of the lithium ions (Li$^+$) and the electroactive particles 220 may occur, in certain aspects, for example when the first container 230 has a surface area much larger than that of the lithium source, and when the electroactive particles 220 touch a ground surface, for example on or comprising an interior surface of the first container 230, so as to obtain electrons, for example electrons remaining following lithium ionization. In other instances, lithium sources having larger surface areas may have faster reaction rates because the probability of collision and contact between the electroactive particles 220 and the lithium sources 240 and/or lithium ions is larger. In certain instances, for example, lithium ions may be plated onto one or more exposed surfaces of the first container 230, for example by electrically connecting the lithium source 240 and one or more exposed surfaces of the first container 230, such plating may further increase the available surface area of the lithium ions and therefore the reaction rate.

Once full lithiation is obtained, the method may further include partially electrochemically discharging (e.g., reducing lithium content) the first lithiated electroactive particles 222 to obtain optimal lithiation conditions, for example about 40%, about 30%, and in certain aspects, optionally about 20% of the total amount of lithium present in the electroactive material in the first or full lithiation state, as represented by second lithiated electroactive particles 224. For example, in certain instances, the first lithiated electroactive particles 222 may comprise silicon and the first or full state may be represented by $Li_{4.4x}Si$ where 0.75≤x≤1. The second or optimized state of the second lithiated electroactive particles 224 may be represented by $Li_{4.4x}Si$, where 0.015≤x≤0.5, including as $Li_{0.8}Si$.

For example, in certain variations, the first lithiated electroactive particles 222 in the first state may be represented by $Li_{3.3}Si$ (where x=0.75), and the second lithiated electroactive particles 224 in the second state having about 40% of the amount of lithium present as compared to the first lithiated electroactive particles 22 may be represented by $Li_{1.32}Si$; the second lithiated electroactive particles 224 in the second state having about 30% of the amount of lithium present as compared to the first lithiated electroactive particles 22 may be represented by $Li_{0.99}Si$; and the second lithiated electroactive particles 224 in the second state having about 20% of the amount of lithium present as compared to the first lithiated electroactive particles 22 may be represented by $Li_{0.66}Si$.

With renewed reference to FIG. 2, as illustrated, through a continuous flow process, the fully lithiated electroactive particles 222 may proceed or travel from the first container 230 to a second container 250. The second container 250 may contain or carry a second electrolyte 260. Like the first container 230, the second container 250 may comprise one or more materials that are non-reactive with the second electrolyte 260 and its contents. For example, the second container 250 may be made of stainless steel, nickel, and/or copper.

The second electrolyte 260 may be the same or different from the first electrolyte 210. For example, in various aspects, the second electrolyte 260 may include one or more lithium salts selected from the group consisting of: lithium hexafluorophosphate (LiPF$_6$); lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium difluorooxalatoborate (LiBF$_2$(C$_2$O$_4$)) (LiODFB), lithium tetraphenylborate (LiB(C$_6$H$_5$)$_4$), lithium bis-(oxalate)borate (LiB(C$_2$O$_4$)$_2$) (LiBOB), lithium tetrafluorooxalatophosphate (LiPF$_4$(C$_2$O$_4$)) (LiFOP), lithium nitrate (LiNO$_3$), lithium hexafluoroarsenate (LiAsF$_6$), lithium trifluoromethanesulfonate (LiCF$_3$SO$_3$), lithium bis(trifluoromethanesulfonimide) (LiTFSI) (LiN(CF$_3$SO$_2$)$_2$), lithium fluorosulfonylimide (LiN(FSO$_2$)$_2$) (LiFSI), lithium fluoroalkylphosphate (LiFAP) (Li$_3$O$_4$P), and combinations thereof and a solvent mixture including one or more of various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof.

A counter electrode 270 is disposed within the second container 250. The counter electrode 270, like the containers 230, 250, may comprise a non-reactive metal and electrochemistry may be driven by an applied external voltage. In certain other aspects, the counter electrode 270 may comprise, for example, graphite, lithium phosphate ($Li_3PO_4$) (LPO), and/or lithium titanate ($Li_2TiO_3$) (LTO). In various aspects, the counter electrode includes a separator 272, for example a porous frit, that coats one or more surfaces of the counter electrode 270 or that forms a sleeve or pocket that receives the counter electrode 270. The separator 272 prevents contact between the counter electrode 270 and the fully lithiated electroactive particles 222 in a first state and/or optimized lithiated electroactive particles 224 in a second state. The separator 272 may be porous, for example in the form of a porous frit having a porosity ranging from greater than or equal to about 20 vol. % to less than or equal to about 99.9 vol. %, and in certain aspects, optionally greater than or equal to about 25 vol. % to less than or equal to about 75 vol. %. The pores have an average size smaller than the average particle diameters of the fully lithiated electroactive particles 222 in a first state and/or optimized lithiated electroactive particles 224 in a second state.

The method includes applying a bias voltage to the counter electrode 270. The bias voltage may cause lithium ions ($Li^+$) to move from the fully lithiated electroactive particles 222 to the counter electrode 270 (e.g., $Li_{4.4}Si \rightarrow Li_{0.8}Si + 3.6\ Li^+ + 3.6\ e^-$) so as to form an optimized lithiated electroactive material that defines an optimized lithiated electroactive particle 224. The applied voltage may depend, in certain aspects, on the selected electroactive material precursor, as well as the design of the containers 230, 250 and various other production steps. For example, in certain aspects, a voltage greater than or equal to about 0.1 V to less than or equal to about 24 V, and in certain aspects, optionally greater than or equal to about 0.5 V to less than or equal to about 10 V, may be applied for a greater than or equal to about 1 minute to less than or equal to about 24 hours, and in certain aspects, optionally greater than or equal to about 5 minutes to less than or equal to about 10 minutes. The optimized lithiated electroactive particle 224 in a second state may have a third average particle diameter greater than or equal to about 10 nm to less than or equal to about 30 μm, and in certain aspects, optionally greater than or equal to about 1 μm to less than or equal to about 10 μm.

In certain variations, the method includes recovering the discharged lithium for reuse (e.g., $3.6\ Li^+ + 3.6\ e^- \rightarrow 3.6)Li^0$. For example, lithium plated on the counter electrode 270 may be used as a lithium source 240 in subsequent lithiation processes by moving the lithium-plated counter electrode 270 from the second container 250 to a first container 230. The method further includes isolating or separating the optimized lithiated electroactive particle 224 in a second state for use in a negative electrode, for example negative electrode 22 illustrated in FIG. 1. The optimized lithiated electroactive particle 224 may be separated from using known filtering and/or centrifugation methods. In certain variations, the method further includes coating the optimized lithiated electroactive particle 224 so as to enhance mechanical stability. For example, the optimized lithiated electroactive particle 224 may be coated after exiting the second container 250 with an alumina ($Al_2O_3$) layer having a thickness greater than or equal to greater than or equal to about 3 nm to less than or equal to about 1 μm, and in certain aspects, optionally greater than or equal to about 0.1 nm to less than or equal to about 0.5 μm. In certain aspects, the optimized lithiated electroactive particle 224 may be coated using an atomic layer deposition ("ALD") process, by way of non-limiting example.

Though a continuous flow process using separate containers 230, 250 is illustrated in FIG. 2, the skilled artisan will appreciate that various other variations, for example a single container, may be used. For example, a lithium source may be removed and a counter electrode added to the original container so as to electrochemically discharge a fully-lithiated electroactive material in a first state. In other aspects, both electrodes (e.g., the lithium source and the counter electrode) may be disposed within the same container. In still other variations, the various steps may be discontinuous, including for example a storage step and/or aging step. In further variations, the process may be a batch flow process.

Figure 3:
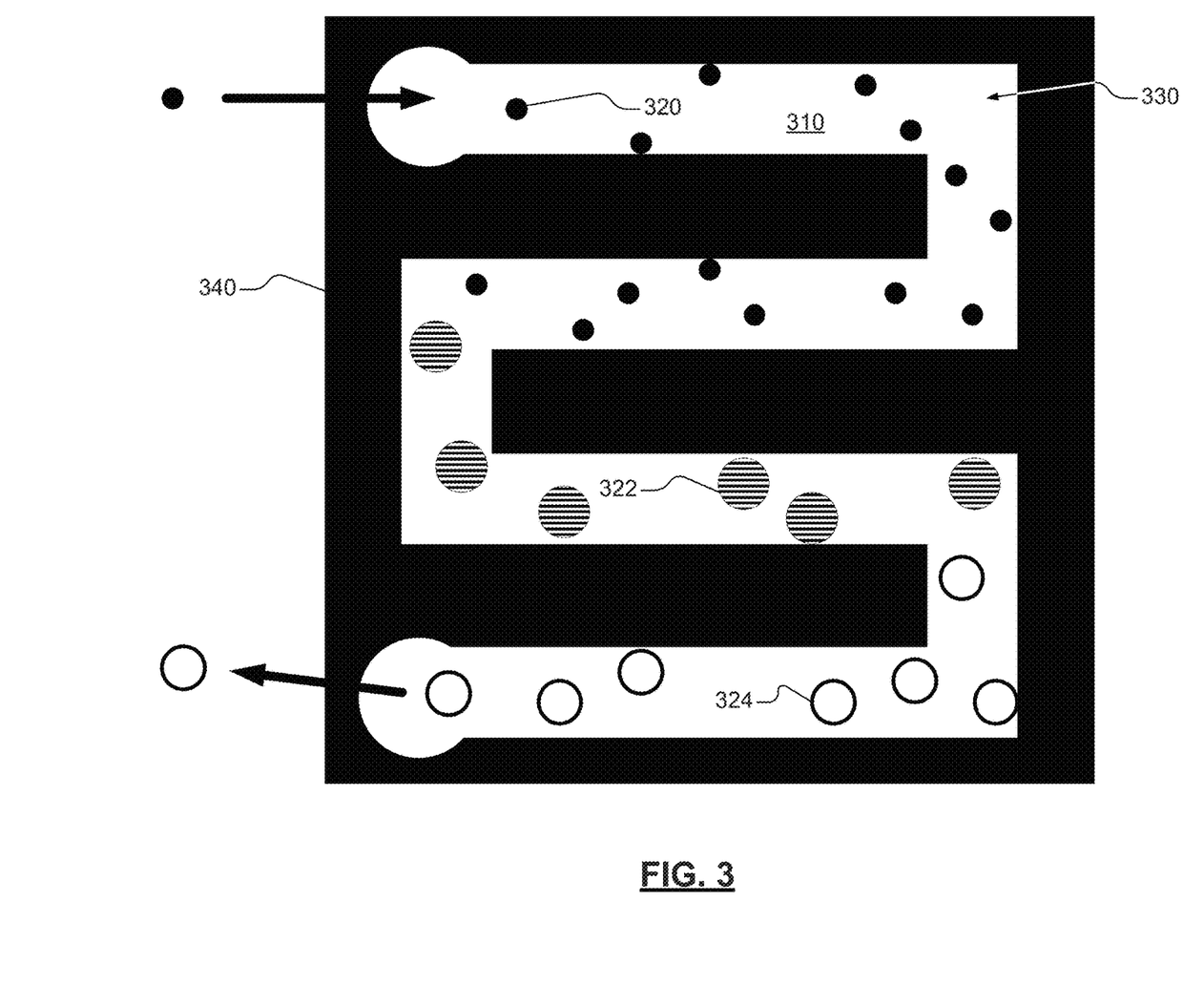
FIG. 3 is a schematic of an example channel flow process for lithiating electroactive materials.

In still further various aspects, the present disclosure provides a channel flow process for making electroactive materials, for example electroactive materials for negative electrode 22 as illustrated in FIG. 1. The method includes moving electroactive material particles through a flow channel comprising a lithium source comprising, for example, lithium metal. For example, as illustrated in FIG. 3, the method may include introducing an electroactive material precursor, for example a plurality of electroactive particles 320, to a flow channel 330 containing or carrying an electrolyte 310.

The flow channel 330 may defined by, or formed from, a lithium source 340, for example a solid lithium selected in the form of lithium plated mesh and/or foam, plates, rods, sheets, ribbons, chunks, powders, granules, other coatings, and/or other forms. In various other instances, though not illustrated, the skilled artisan will appreciate that the lithium source 340 may be disposed, for example as a coating or layer, on exposed surfaces of a substrate defining the flow channel 330. In still other variations, though not illustrated, the skilled artisan will appreciate that the lithium source 340 may be disposed within the flow channel 330. The electroactive particles 320 may have a first average diameter greater than or equal to about 10 nm to less than or equal to about 10 μm, greater than or equal to about 1 μm to less than or equal to about 5 μm, and in certain aspects, optionally about 3 μm. In various aspects, the electroactive particles 320 may comprise, for example, a silicon powder. In certain aspects, the method may include pre-treating the electroactive particle 320, for example using plasma processes, to remove surface oxides, for example silicon oxides ($SiO_x$), so as to improve the kinetics of the electroactive particles 320 both during the lithiation process and during subsequent use in an electrochemical cell, for example battery 20 illustrated in FIG. 1.

The electrolyte 310 may include one or more lithium salts selected from the group consisting of: lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium difluorooxalatoborate ($LiBF_2(C_2O_4)$) (LiODFB), lithium tetraphenylborate ($LiB(C_6H_5)_4$), lithium bis-(oxalate)borate ($LiB(C_2O_4)_2$) (LiBOB), lithium tetrafluorooxalatophosphate ($LiPF_4(C_2O_4)$) (LiFOP), lithium nitrate ($LiNO_3$), lithium hexafluoroarsenate ($LiAsF_6$), lithium trifluoromethanesulfonate ($LiCF_3SO_3$), lithium bis(trifluoromethanesulfonimide) (LiTFSI) ($LiN(CF_3SO_2)_2$), lithium fluorosulfonylimide ($LiN(FSO_2)_2$) (LiFSI), lithium fluoroalkylphosphate (Li- FAP) ($Li_3O_4P$), and combinations thereof and a solvent mixture including one or more of various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane (DME), 1-2-diethoxyethane, ethoxymethoxyethane), cyclic ethers (e.g., tetrahydrofuran, 2-methyltetrahydrofuran, 1,3-dioxolane (DOL)), sulfur compounds (e.g., sulfolane), and combinations thereof.

When the electrolyte 310, which may be at room temperature, contacts the lithium source 340, it ionizes. For example, as noted above, lithium has a comparatively low redox potential, for example about −3.04V compared to the standard hydrogen electrode ("SHE"). Potential differences between the lithium and the electroactive material of the electroactive particles 320 causes electrons ($e^-$) to flow from the lithium source 340 to the electroactive particles 320 such that lithium ions ($Li^+$) are released into the electrolyte 310 as a means of charge compensation. Charge neutrality is achieved when the lithium ions ($Li^+$) upon contacting the electroactive particles 320 follow the electrons and spontaneously form (Δ42 kJ/mol) a fully lithiated electroactive material, for example $Li_{4.4x}Si$ where 0.75≤x≤1, that defines fully lithiated electroactive particles 322 in a first state. The fully lithiated electroactive particles 322 may have a second average particle diameter greater than or equal to about 10 nm to less than or equal to about 30 μm, and in certain aspects, optionally greater than or equal to about 1 μm to less than or equal to about 10 μm. The rate of lithiation may be controlled by the flow rate of the electrolyte 310 and/or the length of the flow channel 330.

Once full lithiation is obtained, the method illustrated in FIG. 3 may further include partially electrochemically discharging (e.g., reducing lithium content) the fully lithiated electroactive particles 322 to obtain optimal lithiation conditions, for example about 40%, about 30%, and in certain aspects, optionally about 20% of the total amount of lithium present in the electroactive material in the first or full lithiation state, as represented by second lithiated electroactive particles 324 (e.g., $Li_{4.4x}Si$, where 0.015≤x≤0.5, such as $Li_{0.8}Si$). Optimized lithiated electroactive particles 324 in a second state may be formed through delithiation that may occur using a counter electrode similar to the method illustrated in FIG. 2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a lithiated electroactive material, the method comprising:

dispersing an electroactive material precursor within an electrolyte that includes a lithium-based salt at room temperature to form an electrolyte mixture;

contacting the electrolyte mixture and a lithium source so as to cause the lithium source to ionize and form lithium ions ($Li^+$), wherein the lithium ions ($Li^+$) react with the electroactive material precursor in the electrolyte mixture to form the lithiated electroactive material in a first state having a first amount of lithium; and electrochemically discharging the lithiated electroactive material to a second state comprising a second amount of lithium that is less than or equal to about 40% of the first amount of lithium.

2. The method of claim 1, wherein after the lithium ions ($Li^+$) react with the electroactive material precursor in the electrolyte mixture, the lithiated electroactive material is in the first state represented by the formula $Li_{4.4x}Si$, where 0.75≤x≤1, and the method further comprises electrochemically discharging the lithiated electroactive material to the second state represented by the formula $Li_{4.4x}Si$, where 0.015≤x≤0.5.

3. The method of claim 2, wherein the electroactive material precursor is a silicon powder precursor, in the first state the lithiated electroactive material comprises $Li_{4.4}Si$, and in the second state the lithiated electroactive material comprises $Li_{0.8}Si$.

4. The method of claim 1, wherein the method for forming the lithiated electroactive material is a continuous flow process, and the dispersing and contacting occurs in a first container and the electrochemically discharging occurs in a second container, wherein the first and second containers are formed from materials that are non-reactive with the electrolyte mixture.

5. The method of claim 4, wherein the first and second containers comprise one or more of stainless steel, nickel, and copper.

6. The method of claim 4, wherein the first and second containers are in fluid communication and the lithiated electroactive material flows from the first container to the second container.

7. The method of claim 4, wherein the second container includes a counter electrode comprising one or more of graphite, lithium phosphate ($Li_3PO_4$) (LPO), and lithium titanate ($Li_2TiO_3$) (LTO).

8. The method of claim 7, wherein the counter electrode is disposed within a separator.

9. The method of claim 7, wherein the method includes applying a voltage bias to the counter electrode, wherein, upon application of the voltage bias, discharged lithium ions ($Li^+$) move from the lithiated electroactive particles to the counter electrode so as to form the lithiated electroactive material having the second state, wherein the voltage bias is greater than or equal to about 0.1 V to less than or equal to about 24 V and the voltage bias is applied for greater than or equal to about 1 minute to less than or equal to about 24 hours.

10. The method of claim 1, wherein the dispersing and contacting occurs in a container and, prior to the electrochemically discharging, the method further comprises extracting the lithium source from the container and disposing a counter electrode within the container and conducting the electrochemically discharging.

11. The method of claim 10, wherein the counter electrode comprises one or more of graphite, lithium phosphate ($Li_3PO_4$) (LPO), and lithium titanate ($Li_2TiO_3$) (LTO), and the container comprises one or more of stainless steel, nickel, and copper.

12. The method of claim 1, wherein, after the electrochemically discharging, discharged lithium ions ($Li^+$) are recaptured and recycled.

13. The method of claim 1, wherein the method further includes isolating the lithiated electroactive material.

14. The method of claim 1, wherein the lithium source coats an interior channel of a channel flow reactor and the electrolyte mixture travels through the channel flow reactor.

15. The method of claim 1, wherein the lithium source defines an interior surface of a channel flow reactor and the electrolyte mixture travels through the channel flow reactor.

16. The method of claim 1, wherein the lithiated electroactive material comprises a plurality of lithiated electroactive particles.

17. A method for forming a lithiated electroactive material, the method comprising:

dispersing a silicon powder precursor within an electrolyte at a room-temperature electrolyte that comprises a lithium-based salt;

contacting the electrolyte mixture and a lithium source so as to cause the lithium source to ionize and form lithium ions ($Li^+$), wherein the lithium ions ($Li^+$) react with the silicon powder precursor to form $Li_{4.4x}Si$, where $0.75 \leq x \leq 1$; and applying a voltage bias to a counter electrode in electrical communication with the $Li_{4.4x}Si$ to cause electrochemical discharge of lithium ions ($Li^+$) that move from $Li_{4.4x}Si$ towards the counter electrode to form $Li_{4.4x}Si$, where $0.015 \leq x \leq 0.5$.

18. The method of claim 17, wherein the voltage bias is greater than or equal to about 0.1 V to less than or equal to about 24 V and the voltage bias is applied for greater than or equal to about 1 minute to less than or equal to about 24 hours.

19. The method of claim 17, wherein the method for forming the lithiated electroactive material is a continuous flow process.

20. The method of claim 17, wherein the lithium source defines an interior channel of a channel flow reactor and the electrolyte mixture travels through the channel flow reactor.

* * * * *